US010927212B2

(12) United States Patent
Hadick et al.

(10) Patent No.: US 10,927,212 B2
(45) Date of Patent: Feb. 23, 2021

(54) VISCOELASTIC FOAMS HAVING HIGH DENSITY

(71) Applicant: BASF SE, Ludwigshafen am Rhein (DE)

(72) Inventors: Udo Hadick, Muenster (DE); Heinz-Dieter Lutter, Huede (DE); Stefanie Hiller, Rahden (DE); Maike Grever, Stemwede-Drohne (DE)

(73) Assignee: BASF SE, Ludwigshafen am Rhein (DE)

( * ) Notice: Subject to any disclaimer, the term of this patent is extended or adjusted under 35 U.S.C. 154(b) by 150 days.

(21) Appl. No.: 16/300,693

(22) PCT Filed: May 2, 2017

(86) PCT No.: PCT/EP2017/060325
§ 371 (c)(1),
(2) Date: Nov. 12, 2018

(87) PCT Pub. No.: WO2017/194341
PCT Pub. Date: Nov. 16, 2017

(65) Prior Publication Data
US 2020/0181315 A1 Jun. 11, 2020

(30) Foreign Application Priority Data
May 12, 2016 (EP) ..................... 16169393

(51) Int. Cl.
| C08G 18/10 | (2006.01) |
| C08G 18/08 | (2006.01) |
| C08G 18/18 | (2006.01) |
| C08G 18/32 | (2006.01) |
| C08G 18/48 | (2006.01) |
| C08G 18/76 | (2006.01) |
| C08G 18/79 | (2006.01) |
| C08J 9/12 | (2006.01) |
| C08G 101/00 | (2006.01) |

(52) U.S. Cl.
CPC ............. *C08G 18/10* (2013.01); *C08G 18/14* (2013.01); *C08G 18/1833* (2013.01); *C08G 18/3206* (2013.01); *C08G 18/4812* (2013.01); *C08G 18/4825* (2013.01); *C08G 18/4829* (2013.01); *C08G 18/4841* (2013.01); *C08G 18/7671* (2013.01); *C08G 18/797* (2013.01); *C08J 9/125* (2013.01); *C08G 2101/0008* (2013.01); *C08G 2101/0058* (2013.01); *C08G 2101/0066* (2013.01); *C08G 2101/0075* (2013.01); *C08G 2101/0083* (2013.01); *C08J 2205/06* (2013.01); *C08J 2375/08* (2013.01)

(58) Field of Classification Search
CPC .... C08G 18/10; C08G 18/14; C08G 18/1833; C08G 18/3206; C08G 18/4812; C08G 18/4825; C08G 18/4829; C08G 18/4841; C08G 18/7671; C08G 18/797; C08G 2101/0008; C08G 2101/0058; C08G 2101/0066; C08G 2101/0075; C08G 2101/0083; C08J 9/125; C08J 2205/06; C08J 2375/08

See application file for complete search history.

(56) References Cited

U.S. PATENT DOCUMENTS

| 3,304,273 | A | | 2/1967 | Stamberger | |
| 3,383,351 | A | | 5/1968 | Stamberger | |
| 3,523,093 | A | | 8/1970 | Stamberger | |
| 5,420,170 | A | * | 5/1995 | Lutter | C08G 18/4804 252/182.24 |
| 7,238,730 | B2 | * | 7/2007 | Apichatachutapan | C08G 18/282 521/174 |
| 2013/0178550 | A1 | * | 7/2013 | Aou | C08G 18/4816 521/176 |
| 2015/0004389 | A1 | * | 1/2015 | Corinti | C08G 18/1833 428/220 |

(Continued)

FOREIGN PATENT DOCUMENTS

| DE | 1111394 B | 7/1961 |
| DE | 1152536 B | 8/1963 |

(Continued)

OTHER PUBLICATIONS

European Search Report for EP Patent Application No. 16169393.2, dated Aug. 31, 2016, 3 pages.

(Continued)

*Primary Examiner* — John M Cooney

(74) *Attorney, Agent, or Firm* — Armstrong Teasdale LLP

(57) ABSTRACT

Provided herein is a process for producing viscoelastic polyurethane foams having a density of from 100 g/dm$^3$ to 300 g/dm$^3$, in which (a) polyisocyanate is mixed with (b) polymeric compounds having groups that are reactive toward isocyanates, (d) a catalyst, and (e) a blowing agent including water at an isocyanate index of from 50 to 95 to give a reaction mixture. The reaction mixture is placed in a mold and reacted to give the flexible polyurethane foam, wherein the polyisocyanate (a) is obtainable by mixing 4,4'-MDI and oligomers of propylene oxide having from 2 to 8 propylene oxide units. The polymeric compounds (b) include at least one polyalkylene oxide having a hydroxyl number of from 20 to 50 mg KOH/g derived from a trifunctional starter molecule and a proportion of ethylene oxide, based on the content of alkylene oxide, of from 0 to 10% by weight.

8 Claims, No Drawings

(56) References Cited

U.S. PATENT DOCUMENTS

2015/0252140 A1* 9/2015 Smiecinski ........ C08G 18/7621
521/118

FOREIGN PATENT DOCUMENTS

| DE | 1152537 B | 8/1963 |
| --- | --- | --- |
| DE | 3710731 A1 | 4/1989 |
| DE | 3942330 A1 | 6/1991 |
| WO | 2008055952 A1 | 5/2008 |
| WO | 2009128279 A1 | 10/2009 |
| WO | WO-2017/194340 A1 | 11/2017 |

OTHER PUBLICATIONS

International Search Report for International Application No. PCT/EP2017/060325, dated Jul. 7, 2017, 2 pages.

* cited by examiner

VISCOELASTIC FOAMS HAVING HIGH DENSITY

CROSS-REFERENCE TO RELATED APPLICATIONS

This application is the national stage entry of PCT/EP2017/060325, filed on May 2, 2017, which claims the benefit of priority to European Patent Application No. 16169393.2, filed May 12, 2016, which are incorporated by reference in their entirety herein.

Field of the Invention

The present invention relates to a process for producing viscoelastic polyurethane foams having a density of from 100 g/dm$^3$ to 300 g/dm$^3$, in which (a) polyisocyanate is mixed with (b) polymeric compounds having groups which are reactive toward isocyanates, (c) optionally chain extenders and/or crosslinkers, (d) catalyst, (e) blowing agent comprising water and optionally (f) additives at an isocyanate index of from 50 to 95 to give a reaction mixture, the reaction mixture is placed on a support and reacted to give the flexible polyurethane foam, wherein the polyisocyanate (a) has an isocyanate content of from 20 to 31.5% and is obtainable by mixing 4,4'-MDI and oligomers of propylene oxide having from 2 to 8 propylene oxide units, optionally carbodiimide of 4,4'-MDI and optionally higher homologues of MDI having more than two rings and the polymeric compounds (b) having groups which are reacted toward isocyanates comprise (b1) from 15 to 40% by weight of at least one polyalkylene oxide having a hydroxyl number of from 20 to 50 mg KOH/g derived from a trifunctional starter molecule and a proportion of ethylene oxide, based on the content of alkylene oxide, of from 0 to 10% by weight and a proportion of primary OH groups of from 50 to 100%, (b2) from 30 to 70% by weight of at least one polyalkylene oxide having a hydroxyl number of from 20 to 50 mg KOH/g derived from a bifunctional starter molecule and a proportion of ethylene oxide, based on the content of alkylene oxide, of from 0 to 10% by weight and a proportion of primary OH groups of from 50 to 100%, (b3) from 10 to 30% by weight of at least one polyalkylene oxide having a hydroxyl number of from 400 to 800 mg KOH/g derived from a bifunctional to tetrafunctional starter molecule and a proportion of ethylene oxide, based on the content of alkylene oxide, of from 80 to 100% by weight and (b4) from 0 to 30% by weight of a further polyalkylene oxide. The present invention further relates to a polyurethane foam obtainable by such a process and the use of such a polyurethane foam in the production of mattresses or upholstery for furniture or as insulation, for example in the vicinity of engines such as internal combustion engines.

Background

Viscoelastic flexible polyurethane foams have gained ever greater importance in recent years. They are used, in particular, for producing upholstery, pillows, mattresses or for damping of vibrations, there for example in foam backing of carpets or filling hollow spaces with foam. Viscoelastic foams display a slow recovery behavior in going back to their original shape after compression.

At present, two different groups of viscoelastic foams which differ in terms of their cell structure and mechanism of the viscoelasticity have been described.

Pneumatically (physically) viscoelastic foams (pVE) are closed-celled flexible PU foams having perforated cell membranes in which the air permeability is very low. When such a foam is compressed, the air is pressed out from the cells. When the compression is released, the foam can relax back to its original form only as quickly as the air permeability permits. The recovery time is therefore dependent, inter alia, on the degree of perforation or the open-celled nature of the flexible PU foam. The more closed-celled the flexible PU foam, the slower the recovery.

Viscoelastic flexible polyurethane foams have gained ever greater importance in recent years. They are used, in particular, for producing upholstery, pillows, mattresses or for damping of vibrations, there for example in foam backing of carpets or filling hollow spaces with foam. Viscoelastic foams display a slow recovery behavior in going back to their original shape after compression.

At present, two different groups of viscoelastic foams which differ in terms of their cell structure and mechanism of the viscoelasticity have been described.

Pneumatically (physically) viscoelastic foams (pVE) are closed-celled flexible PU foams having perforated cell membranes in which the air permeability is very low. When such a foam is compressed, the air is pressed out from the cells. When the compression is released, the foam can relax back to its original form only as quickly as the air permeability permits. The recovery time is therefore dependent, inter alia, on the degree of perforation or the open-celled nature of the flexible PU foam. The more closed-celled the flexible PU foam, the slower the recovery.

The pneumatically viscoelastic polyurethane foams have the disadvantage that the highly closed-celled nature permits only very little air exchange. Without this air exchange, heat cannot be removed, e.g. from the human body, which leads to increased perspiration and humid air, e.g. from perspiration from the human body or from the washing process, can also not be transported away. Furthermore, the viscoelastic properties are often also lost over time since the cell membranes are after a certain time no longer able to regulate air exchange to the required extent.

Description

Structurally or chemically viscoelastic flexible polyurethane foams (cVE) have a glass transition temperature which is in the vicinity of the use temperature. Such cVE foams can be open-celled and nevertheless viscoelastic.

The recovery time is set here by use of a specific polyether polyol composition and also a more or less freely selectable isocyanate component. An open-celled foam is particularly advantageous for the particular comfort of lying on mattresses and pillows because air exchange is made possible thereby and an improved microclimate is achieved. The viscoelastic properties of the foam also do not decrease over time.

Such a chemically viscoelastic polyurethane foam is described, for example, in DE 3710731. This has a high adhesivity. To produce this foam, an isocyanate prepolymer is foamed with an excess of polyols at an isocyanate index of preferably less than or equal to 70. The example describes a polyurethane foam having a density of 120 g/dm$^3$. How precisely these foams are to be produced and at what temperature the reported loss factors in the examples were determined is not disclosed.

DE 3942330 discloses a viscoelastic polyurethane foam obtained by reaction of block polyoxypropylene-polyoxyethylene polyol mixture having a hydroxyl number of from 14 to 65 and a content of terminal ethylene oxide units of from 2 to 9% by weight, based on the weight of the polyoxypropylene units, which has been prepared by anionic polymerization at elevated temperatures of 1,2-propylene oxide on to a starter molecule mixture having an average functionality of from 2.3 to 2.8 derived from water and glycerol and/or trimethylolpropane and polymerization of ethylene oxide on to the resulting polyoxypropylene adduct and aii) at least one bifunctional and/or trifunctional polyoxypropylene-polyoxyethylene polyol having a content of oxyethylene units of from 60 to 85% by weight, based on the total weight of polymerized alkylene oxide units, and a hydroxyl number of from 20 to 80 with polyisocyanates. Viscoelastic polyurethane foams which display viscoelastic properties over a wide temperature range from −20° C. to +80° C. are obtained in this way. The foams in the examples display densities in the range from 70 to 77 g/dm$^3$.

A substantial disadvantage of known chemically viscoelastic polyurethane foams is the temperature dependence of the viscoelasticity, since this usually occurs only in a small range above the glass transition temperature. A further disadvantage is that a high proportion of water has to be used in the production of the viscoelastic foams, since the urea bonds obtained thereby have a positive influence on the viscoelasticity. Due to the high usage of water, foams having densities of less than 100 g/dm$^3$ are usually obtained. Since many mechanical properties such as tensile strength and tear propagation resistance and also the compression set are dependent on the density, it has been possible only to a limited extent to obtain viscoelastic polyurethane foams having good mechanical properties. In addition, a high urea content leads to relatively high hardnesses of the foam.

It was an object of the present invention to obtain a viscoelastic polyurethane foam which has a density of from 100 to 300 g/dm$^3$ and has excellent mechanical properties and displays viscoelastic properties over a wide temperature range.

This object was achieved by a process for producing viscoelastic polyurethane foams having a density of from 100 g/dm$^3$ to 300 g/dm$^3$, in which (a) polyisocyanate is mixed with (b) polymeric compounds having groups which are reactive toward isocyanates, (c) optionally chain extenders and/or crosslinkers, (d) catalyst, (e) blowing agent comprising water and optionally (f) additives at an isocyanate index of from 50 to 95 to give a reaction mixture, the reaction mixture is placed on a support, for example into a mold, and reacted to give the flexible polyurethane foam, wherein the polyisocyanate (a) has an isocyanate content of from 20 to 31.5% and is obtainable by mixing 4,4'-MDI and oligomers of propylene oxide having from 2 to 8 propylene oxide units, optionally carbodiimide of 4,4'-MDI and optionally higher homologues of MDI having more than two rings and the polymeric compounds (b) having groups which are reacted toward isocyanates comprise (b1) from 15 to 40% by weight of at least one polyalkylene oxide having a hydroxyl number of from 20 to 50 mg KOH/g derived from a trifunctional starter molecule and a proportion of ethylene oxide, based on the content of alkylene oxide, of from 0 to 10% by weight and a proportion of primary OH groups of from 50 to 100%, (b2) from 30 to 70% by weight of at least one polyalkylene oxide having a hydroxyl number of from 20 to 50 mg KOH/g derived from a bifunctional starter molecule and a proportion of ethylene oxide, based on the content of alkylene oxide, of from 0 to 10% by weight and a proportion of primary OH groups of from 50 to 100%, (b3) from 10 to 30% by weight of at least one polyalkylene oxide having a hydroxyl number of from 400 to 800 mg KOH/g derived from a bifunctional to tetrafunctional starter molecule and a proportion of ethylene oxide, based on the content of alkylene oxide, of from 80 to 100% by weight and (b4) from 0 to 30% by weight of a further polyalkylene oxide.

The present invention further relates to a viscoelastic polyurethane foam obtainable by such a process and to the use of a polyurethane foam according to the invention in the production of mattresses or upholstery elements, for example for furniture or in the automobile sector, e.g. automobile seats or armrests or headrests or as insulation, for example in the vicinity of engines such as internal combustion engines.

For the purposes of the present invention, a viscoelastic polyurethane foam is a flexible polyurethane foam which has been produced on a support, for example on a belt or in an open or closed mold. When the polyurethane foam has been produced in a mold, it is referred to as a molded polyurethane foam. The molded polyurethane foam preferably has a higher density in the surface zone than in the core. In many cases, the surface zone of the molded flexible polyurethane foams according to the invention is less than 1 mm thick, preferably less than 0.5 mm thick. The overall foam density averaged over the core and the surface zone is in the range from 100 g/dm$^3$ to 300 g/dm$^3$, preferably from 120 g/dm$^3$ to 250 g/dm$^3$, particularly preferably from 140 g/dm$^3$ to 220 g/dm$^3$ and in particular from 150 g/dm$^3$ to 200 g/dm$^3$.

The viscoelastic polyurethane foams of the invention have a rebound resilience in accordance with DIN EN ISO 8307 at 20° C. of less than 30%, particularly preferably less than 20% and in particular less than 15%. Furthermore, the molded polyurethane foams according to the invention display a high damping behavior which is expressed by a value for tan delta in the range from −40 to +40° C. of greater than 0.15 in the density range from 100 to 300 g/dm$^3$. Here, the tan delta is determined by means of dynamic mechanical analysis (DMA) at a frequency of 1 Hz and in a temperature range from −80 to +200° C. at a deformation of 0.3% using a method based on DIN EN ISO 6721-1, DIN EN ISO 6721-2, DIN EN ISO 6721-7. The temperature program is carried out in 5° C. steps.

The polyurethane foam of the invention preferably has viscoelastic behavior over a wide temperature range. The rebound resilience in accordance with DIN EN ISO 8307 in the temperature range from preferably 0 to 60° C., particularly preferably from 10 to 50 and in particular from 15 to 40° C., is not more than 20%.

The polyisocyanates (a) used for producing the polyurethane foams of the invention have an isocyanate content of from 20 to 31.5% by weight, preferably from 25 to 30% by weight. The polyisocyanate (a) is obtainable by mixing (a1) diphenylmethane 4,4'-diisocyanate (hereinafter also referred to as 4,4'-MDI) and (a2) oligomers of propylene oxide having from 2 to 8, preferably from 2 to 6, propylene oxide units, optionally (a3) carbodiimide of 4,4'-MDI and optionally (a4) higher homologues of diphenylmethane diisocyanate (MDI) having more than two rings. The order of addition of the constituents of the mixture to the mixture is not subject to any restrictions. However, preference is given to proceeding in such a way that a stoichiometric excess of isocyanate groups is always present. Thus, for example, the carbodiimide of 4,4'-MDI can also be added after complete reaction of the OH groups of the oligomeric propylene oxide with isocyanate groups. Preference is given to the proportion of 4,4'-MDI (a1) being from 50 to 95% by weight, particularly preferably from 60 to 90% by weight, the proportion of oligomers of propylene oxide (a2) being from 1 to 15% by weight, particularly preferably from 5 to 12% by weight, the proportion of the carbodiimide (a3) being from 0 to 15% by weight, particularly preferably from 5 to 12% by weight, and the proportion of the higher homologues of MDI having more than two rings (a4) being from 0 to 15% by weight, particularly preferably from 5 to 12% by weight, in each case based on the total weight of the polyisocyanates (a). In a particularly preferred embodiment, either carbodiimide or higher homologues of MDI having more than two rings is/are used. In a very preferred embodiment, less than 10% by weight, based on the total weight of the polyisocyanates (a), of further compounds comprising isocyanate groups and more preferably no further compounds comprising isocyanate groups are present in addition to the polyisocyanates (a) in the component a).

Polymeric compounds (b) having groups which are reactive toward isocyanate have a number average molecular weight of at least 450 g/mol, particularly preferably from 460 to 12 000 g/mol, and have at least two hydrogen atoms which are reactive toward isocyanate per molecule. As polymeric compounds (b) having groups which are reactive toward isocyanate, preference is given to polyester alcohols and/or polyether alcohols having a functionality of from 2 to 8, in particular from 2 to 6, preferably from 2 to 4, and an average equivalent molecular weight in the range from 400 to 3000 g/mol, preferably from 1000 to 2500 g/mol. In particular, polyether alcohols are used.

The polyether alcohols can be prepared by known methods, usually by catalytic addition of alkylene oxides, in particular ethylene oxide and/or propylene oxide, on to H-functional starter substances, or by condensation of tetrahydrofuran. In the case of alkylene oxides being added on, the term polyalkylene oxide polyols is also used. H-functional starter substances used are, in particular, polyfunctional alcohols and/or amines. Preference is given to using water, dihydric alcohols, for example ethylene glycol, propylene glycol or butanediols, trihydric alcohols, for example glycerol or trimethylolpropane, and also higher-functional alcohols such as pentaerythritol, sugar alcohols, for example sucrose, glucose or sorbitol. Amines which are preferably used are aliphatic amines having up to 10 carbon atoms, for example ethylenediamine, diethylenetriamine, propylenediamine, and also amino alcohols such as ethanolamine or diethanolamine. Ethylene oxide and/or propylene oxide are preferably used as alkylene oxides, with an ethylene oxide block frequently being added on at the end of the chain in the case of polyether alcohols used for the production of flexible polyurethane foams. As catalysts in the addition reaction of the alkylene oxides, use is made of, in particular, basic compounds, with potassium hydroxide having the greatest industrial importance here. When the content of unsaturated constituents in the polyether alcohols is intended to be low, dimetal or multimetal cyanide compounds, known as DMC catalysts, can also be used as catalysts. In particular, bifunctional and/or trifunctional polyalkylene oxide polyols are used for producing viscoelastic flexible polyurethane foams.

Furthermore, polyester polyols, which can, for example, be prepared from organic dicarboxylic acids having from 2 to 12 carbon atoms, preferably aliphatic dicarboxylic acids having from 8 to 12 carbon atoms, and polyhydric alcohols, preferably diols, having from 2 to 12 carbon atoms, preferably from 2 to 6 carbon atoms, can be used as compound having at least two active hydrogen atoms. Possible dicarboxylic acids are, for example: succinic acid, glutaric acid, adipic acid, suberic acid, azelaic acid, sebacic acid, decanedicarboxylic acid, maleic acid, fumaric acid, phthalic acid, isophthalic acid, terephthalic acid and the isomeric naphthalenedicarboxylic acids. Preference is given to using adipic acid. The dicarboxylic acids can be used either individually or in admixture with one another. It is also possible to use the corresponding dicarboxylic acid derivatives, e.g. dicarboxylic esters of alcohols having from 1 to 4 carbon atoms or dicarboxylic anhydrides, instead of the free dicarboxylic acids.

Examples of dihydric and polyhydric alcohols, in particular diols, are: ethanediol, diethylene glycol, 1,2- or 1,3-propanediol, dipropylene glycol, 1,4-butanediol, 1,5-pentanediol, 1,6-hexanediol, 1,10-decanediol, glycerol and trimethylolpropane. Preference is given to using ethanediol, diethylene glycol, 1,4-butanediol, 1,5-pentanediol, 1,6-hexanediol or mixtures of at least two of the diols mentioned, in particular mixtures of 1,4-butanediol, 1,5-pentanediol and 1,6-hexanediol. It is also possible to use polyester polyols derived from lactones, e.g. ε-caprolactone or hydroxycarboxylic acids, e.g. ω-hydroxycaproic acid and hydroxybenzoic acids. Preference is given to using dipropylene glycol.

Here, the polymeric compounds (b) having groups which are reactive toward isocyanate comprise from 15 to 40% by weight, preferably from 20 to 35% by weight, based on the total weight of the component (b), of at least one polyalkylene oxide having a hydroxyl number of from 20 to 50 mg KOH/g, preferably from 35 to 45 mg KOH/g derived from a trifunctional starter molecule and a proportion of ethylene oxide, based on the content of alkylene oxide, of from 0 to 10% by weight, preferably from 4 to 8% by weight; particularly preferably from 5.5 to 6.5% by weight, and a proportion of primary OH groups of from 50 to 100, preferably from 70 to 100 and particularly preferably from 90 to 100, based on the number of OH groups in the compound (b1). For the purposes of the invention, a proportion of ethylene oxide of a polyether is the proportion of [$CH_2$—$CH_2$—O]— structural units in the polyalkylene oxide. Analogous definitions apply to the proportion of the propylene oxide and the further alkylene oxides used.

Furthermore, the polymeric compounds (b) having groups which are reactive toward isocyanate comprise from 30 to 70% by weight, preferably from 45 to 60% by weight, based on the total weight of the component (b), of at least one polyalkylene oxide having a hydroxyl number of from 20 to 50 mg KOH/g, at least one polyalkylene oxide having a hydroxyl number of from 20 to 50 mg KOH/g, preferably from 35 to 45 mg KOH/g, derived from a bifunctional starter molecule and a proportion of ethylene oxide, based on the content of alkylene oxide, of from 0 to 10% by weight, preferably from 4 to 8% by weight and particularly preferably from 5.5 to 6.5% by weight, and a proportion of primary OH groups of from 50 to 100, preferably from 70 to 100 and particularly preferably from 90 to 100, based on the number of OH groups in the compound (b2).

In a preferred embodiment, the weight ratio of the polyols (b1) and (b2) is from 1:1.5 to 1:2.5 and particularly preferably from 1:1.8 to 1:2.2.

Preference is given to using glycerol or trimethylolpropane, particularly preferably glycerol, as trifunctional starters, and water, dihydric alcohols, for example ethylene glycol, propylene glycol or butanediols, preferably water, as bifunctional starters. The starters can be used either alone or in mixtures. In a particularly preferred embodiment, the polyols (b1) and (b2) are prepared from a mixture of the trifunctional and bifunctional starter substances. This mixture of starter substances is then preferably alkoxylated as described above with the aid of basic catalysts or DMC catalysts. Here, the starter mixture is usually reacted with propylene oxide in a first step and, in a second step, ethylene oxide is added at the end of the reaction to produce the primary OH groups.

Particular preference is given to using a mixture of glycerol and water, with the weight ratio of glycerol to water preferably being from 1:1.5 to 1:2.5 and particularly preferably from 1:1.8 to 1:2.2.

Apart from the polyols (b1) and (b2), use is made of from 10 to 30% by weight, based on the total weight of the component (b), of at least one polyalkylene oxide having a hydroxyl number of from 20 to 50 mg KOH/g, at least one polyalkylene oxide (b3) having a hydroxyl number of from 400 to 800 mg KOH/g, preferably from 450 to 650 mg KOH/g, derived from a bifunctional to tetrafunctional, preferably trifunctional, starter molecule and a proportion of ethylene oxide, based on the content of alkylene oxide, of from 80 to 100% by weight, preferably from 90 to 100% by weight and in particular 100% by weight.

Apart from the polyether alcohols (b1), (b2) and (b3), it is possible to use from 0 to 30% by weight, preferably from 0 to 15% by weight, particularly preferably from 0 to 5% by weight, of further polymeric compounds having groups which are reactive toward isocyanates and in particular no further polymeric compounds having groups which are reactive toward isocyanates. Such a compound is preferably a polyether alcohol (b4).

Polyether alcohols (b4) comprise not only the above-described traditional polyetherols but also filler-comprising polyetherols, also referred to as polymer polyetherols. Such compounds preferably comprise dispersed particles of thermoplastic polymers, for example made up of olefinic monomers such as acrylonitrile, styrene, (meth)acrylates, (meth)acrylic acid and/or acrylamide. Such filler-comprising polyols are known and commercially available. Their preparation is, for example, described in DE 111 394, U.S. Pat. Nos. 3,304,273, 3,383,351, 3,523,093, DE 1 152 536, DE 1 152 537, WO 2008/055952 and WO2009/128279.

Substances having a molecular weight of less than 400 g/mol, preferably from 60 to 350 g/mol, are used as chain extenders and/or crosslinkers (c), with chain extenders having 2 hydrogen atoms which are reactive toward isocyanates and crosslinkers having at least 3 hydrogen atoms which are reactive toward isocyanate. These can be used individually or in the form of mixtures. Preference is given to using diols and/or triols having molecular weights of less than 400, particularly preferably from 60 to 300 and in particular from 60 to 150. Possibilities are, for example, aliphatic, cycloaliphatic and/or aromatic diols, and also diols having aromatic structures, having from 2 to 14, preferably from 2 to 10, carbon atoms, e.g. ethylene glycol, 1,3-propanediol, 1,10-decanediol, o-, m-, p-dihydroxycyclohexane, diethylene glycol, dipropylene glycol and preferably 1,4-butanediol, 1,6-hexanediol and bis(2-hydroxyethyl)hydroquinone, triols such as 1,2,4-, 1,3,5-trihydroxycyclohexane, glycerol and trimethylolpropane and low molecular weight hydroxyl-comprising polyalkylene oxides based on ethylene oxide and/or 1,2-propylene oxide and the abovementioned diols and/or triols as starter molecules. Particular preference is given to using monoethylene glycol, 1,4-butanediol and/or glycerol as chain extenders (c).

If chain extenders, crosslinkers or mixtures thereof are employed, these are advantageously used in amounts of from 0.1 to 20% by weight, preferably from 0.5 to 10% by weight and in particular from 0.8 to 5% by weight, based on the weight of the components (b) and (c).

As catalysts (d) for producing the viscoelastic polyurethane foams, preference is given to using compounds which strongly accelerate the reaction of the compounds comprising hydroxyl groups of the components (b) and (c) with the polyisocyanates (a) and/or the reaction of the isocyanates with water. Mention may be made by way of example of amidines such as 2,3-dimethyl-3,4,5,6-tetrahydropyrimidine, tertiary amines such as triethylamine, tributylamine, dimethylbenzylamine, N-methylmorpholine, N-ethylmorpholine, N-cyclohexylmorpholine, N,N,N',N'-tetramethylethylenediamine, N,N,N',N'-tetramethylbutanediamine, N,N,N',N'-tetramethylhexanediamine, pentamethyldiethylenetriamine, bis(dimethylaminoethyl) ether, bis(dimethylaminopropyl)urea, dimethylpiperazine, 1,2-dimethylimidazole, 1-azabicyclo[3.3.0]octane and preferably 1,4-diazabicyclo[2.2.2]octane and alkanolamine compounds such as triethanolamine, triisopropanolamine, N-methyldiethanolamine and N-ethyldiethanolamine and dimethylethanolamine. Organic metal compounds, preferably organic tin compounds such as tin(II) salts of organic carboxylic acids, e.g. tin(II) acetate, tin(II) octoate, tin(II) ethylhexanoate and tin(II) laurate, and the dialkyltin(IV) salts of organic carboxylic acids, e.g. dibutyltin diacetate, dibutyltin dilaurate, dibutyltin maleate and dioctyltin diacetate, and also bismuth carboxylate such as bismuth(III) neodecanoate, bismuth 2-ethylhexanoate and bismuth octanoate, or mixtures thereof are likewise possible. The organic metal compounds can be used either alone or preferably in combination with strongly basic amines.

Preference is given to using exclusively amine catalysts as catalysts (d). Preference is given to using from 0.001 to 5% by weight, in particular from 0.05 to 2% by weight, of catalyst or catalyst combination, based on the weight of the component (b).

Furthermore, one or more blowing agents (e) are present in the production of polyurethane foams. It is possible to use chemically acting blowing agents and/or physically acting compounds as blowing agents (e). For the purposes of the present invention, chemical blowing agents are compounds which form gaseous products by reaction with isocyanate, for example water or formic acid. Physical blowing agents are compounds which are dissolved or emulsified in the starting materials of polyurethane production and vaporized under the conditions of polyurethane formation. These are, for example, hydrocarbons, halogenated hydrocarbons and other compounds, for example perfluorinated alkanes such as perfluorohexane, chlorofluorocarbons and ethers, esters, ketones and/or acetals, for example (cyclo)aliphatic hydrocarbons having from 4 to 8 carbon atoms, fluorinated hydrocarbons such as Solkane® 365 mfc, or gases such as carbon dioxide. In a preferred embodiment, a mixture of these blowing agents comprising water, particularly preferably exclusively water, is used as blowing agent.

In a preferred embodiment, the content of physical blowing agents (e), if present, is in the range from 1 to 20% by weight, in particular from 5 to 20% by weight, and the amount of water is preferably in the range from 0.1 to 2.0% by weight, particularly preferably from 0.3 to 1.0% by weight and in particular from 0.5 to 0.8% by weight, in each case based on the total weight of the components (a) to (e).

As auxiliaries and/or additives (f), use is made of, for example, surface-active substances, foam stabilizers, cell regulators, external and internal mold release agents, fillers, pigments, dyes, flame retardants, antistatics, hydrolysis inhibitors and fungistatic and bacteriostatic substances.

Further information regarding the starting materials used may be found, for example, in the Kunststoffhandbuch, volume 7, Polyurethane, edited by Gunter Oertel, Carl-Hanser-Verlag, Munich, 3rd edition 1993, chapter 5, Polyurethanweichschaumstoffe.

In the production of the viscoelastic polyurethane foams of the invention, the polymeric compounds (b) having groups which are reactive toward isocyanates, the chain extenders and/or crosslinkers (c) which are optionally used, the catalysts (d), the blowing agents (e) and also the auxiliaries and/or additives (f) which are optionally concomitantly used are usually mixed to give a polyol component and reacted in this form with the polyisocyanates a).

To produce the viscoelastic polyurethane foams of the invention, the polyisocyanate prepolymers are reacted with the polymeric compounds having groups which are reactive toward isocyanates in the presence of the abovementioned blowing agents, catalysts and auxiliaries and/or additives (polyol component). Here, the mixing ratios are selected so that the equivalence ratio of NCO groups of the polyisocyanates (a) to the sum of the reactive hydrogen atoms of the components (b) and (f) and, if present, (c) and (d) is preferably 0.5-0.95:1, preferably 0.6-0.8:1 and in particular 0.65-0.75:1. A ratio of 1:1 corresponds to an isocyanate index of 100.

The production of the polyurethane foams of the invention is preferably carried out by the one-shot process, for example with the aid of the high-pressure or low-pressure technique.

Here, the foams according to the invention are, for example, produced on a belt or preferably in a mold. The molded polyurethane foams can be produced in open or closed, for example metallic molds.

It is particularly advantageous to proceed according to the two-component process in which, as indicated above, a polyol component is produced and foamed with polyisocyanate a). The components are preferably mixed at a temperature in the range from 15 to 120° C., preferably from 20 to 80° C., and introduced into the mold or placed on the conveyor belt. The temperature in the mold is usually in the range from 15 to 120° C., preferably from 30 to 80° C. The molded polyurethane foam obtained in this way is likewise subject matter of the present invention. It is open-celled and can be used without pressing and squeezing. It also has a nonsticky surface, as a result of which occupational hygiene and consumer acceptance, particularly in the field of furniture and mattresses, is improved.

Polyurethane foams according to the invention are preferably used for insulating and damping elements, in particular in vehicle construction, for example as carpet backing, for upholstery, sitting or lying furniture, for mattresses or cushions, for example in the orthopedic and/or medical sector, or for shoe insoles. Suitable for this are A further field of use is automobile safety components, support surfaces, armrests and similar parts in the furniture sector and in automobile construction. Furthermore, viscoelastic components are used for acoustic insulation and damping. The flexible polyurethane foams of the invention are particularly preferably used for mattresses and cushions.

The viscoelastic polyurethane foams of the invention display excellent mechanical properties, in particular excellent values for the tensile strength and the elongation at break. At the same time, the viscoelastic polyurethane foams of the invention have excellent air permeabilities. The polyurethane foams of the invention, in particular molded polyurethane foams, surprisingly display not only excellent mechanical properties but also viscoelastic properties over a wide temperature range and excellent thermal stability. This makes it possible to produce, for example, mattresses having viscoelastic properties independently of room temperature and thus comfort properties which remain the same in summer and in winter. The temperature-independent viscoelasticity and the high heat resistance also allows use of the foams according to the invention in a hot environment, for example in acoustic insulation in the direct vicinity of hot machine components, for example in the engine space of automobiles. This use is further assisted by the good aging properties, even at high temperatures.

The invention is illustrated below with the aid of examples.

EXAMPLES ACCORDING TO THE INVENTION

To determine the mechanical properties, test plates of 18.5×19.5×3.8 cm were produced in a closed mold. Here, a polyol component as per table 1 was produced, mixed in a high-pressure mixing head at 35° C. with the isocyanate component indicated at an isocyanate index of 65 and introduced into the mold which had been heated to 60° C. After 5 minutes, the molding was removed from the mold. The following starting materials were used:

Polyol 1: polyalkylene oxide obtainable by alkoxylation of a mixture of glycerol and water as starter molecules in a molar ratio of 1:2. The mixed polyether has a hydroxyl number of 30 mg KOH/g, a proportion of ethylene oxide, based on the content of alkylene oxide, of 6% by weight and a proportion of primary OH groups, based on the total number of OH groups in the polyol 1, of 68%.

Polyol 2: polyalkylene oxide obtainable by ethoxylation of trimethylolpropane as starter molecule and having a hydroxyl number of 600 mg KOH/g, a proportion of ethylene oxide, based on the content of alkylene oxide, of 100% by weight and a proportion of primary OH groups, based on the total number of OH groups in the polyol 2, of 100%.

Polyol 3 polyalkylene oxide obtainable by alkoxylation of glycerol as starter molecule and having a hydroxyl number of 35 mg KOH/g, a proportion of ethylene oxide, based on the content of alkylene oxide, of 14% by weight and a proportion of primary OH groups, based on the total number of OH groups in the polyol 3, of 72%.

Polyol 4: polyalkylene oxide obtainable by ethoxylation of trimethylolpropane as starter molecule and having a hydroxyl number of 935 mg KOH/g, a proportion of ethylene oxide, based on the content of alkylene oxide, of 100% by weight and a proportion of primary OH groups, based on the total number of OH groups in the polyol 4, of 100%.

Polyol 5: polyetherol obtainable by alkoxylation of glycerol as starter molecule and having a hydroxyl number of 42 mg KOH/g, a proportion of ethylene oxide, based on the content of alkylene oxide, of 72.5% by weight of which 5% is present as a terminal block and the remaining ethylene oxide units are randomly distributed in the middle part.

Polyol 6: polyetherol obtainable by alkoxylation of glycerol as starter molecule and having a hydroxyl number of 28 mg KOH/g, a proportion of terminally bound ethylene oxide, based on the content of alkylene oxide, of 14% by weight.

Cat. 1: bis(dimethylaminoethyl) ether (70% in dipropylene glycol)

Cat. 2: triethylenediamine (33% in MEG)

Stab: siloxane stabilizer from Evonik

Iso 1: Prepolymer derived from 87% by weight of 4,4'-MDI and 8% by weight of dipropylene glycol and 5% by weight of polypropylene glycol; NCO: 23% by weight.

Iso 2: Prepolymer derived from 8% by weight of polypropylene glycol having an OH number of 250, 28% by weight of higher homologues of MDI having more than two rings, 61.7% by weight of 4,4'-MDI and 2.3% by weight of 2,4'-MDI having an NCO content of 28.5% by weight.

Iso 3: 76% by weight of 4,4'-MDI, 24% by weight of carbodiimide of 4,4'-MDI, isocyanate content 29.5% by weight.

Iso 4: Crude MDI having a content of monomeric MDI isomers of 39% by weight and an NCO content of 31.3% by weight.

TABLE 1

|  | Example 1 | Example 2 | Comp. 1 |
|---|---|---|---|
| Polyol 1 | 82.6 | 82.8 |  |
| Polyol 2 | 15 | 15 | 15 |
| Polyol 3 |  |  | 82.8 |
| Polyol 4 |  |  |  |
| Cat. 1 | 0.4 | 0.4 | 0.4 |
| Cat. 2 | 0.8 | 0.8 | 0.8 |
| Water | 1.0 | 1.0 | 1.0 |
| Stab. | 0.2 | 0.2 | 0.2 |
| Iso 1 | 50 | 70 | 50 |
| Iso 2 |  | 30 |  |
| Iso 3 | 50 |  | 50 |
| after hot aging |  |  |  |
| Hardness | 4.5 kPa | 6 kPa | 5.2 kPa | shrinkage |
| Density | 173 g/l | 173 g/l | 179 g/l | shrinkage |
|  | 25.8 mm | 25 mm |  | shrinkage |
| Tensile strength | 109 kPa | 118 kPa | 82 kPa | shrinkage |
| Elongation at break | 112% | 99% | 77% | shrinkage |
| Tear propagation resistance | 0.36 N/mm | 0.30 N/mm | 0.22 N/mm | shrinkage |
| Tan delta > 0.15 | −60° C. to 90° C. | −65° C. to 50° C. | −60 to 40° C. | shrinkage | and the tear propagation resistance determined in accordance with DIN ISO 34-1B(b). The table shows that foams having viscoelastic properties are obtained over a wide temperature range. Furthermore, the mechanical properties themselves are very good even after hot storage for 168 hours at 130° C.

In comparative experiments, an attempt was made to reproduce foams as per the examples of DE 3942330 at a density of more than 100 g/l and also foams as per DE 3710731.

In a first comparative experiment, an attempt was made to reproduce the example of DE 3710731. Here, 48 parts by weight of the ethylene oxide-rich polyol 5 were used as polyetherol having a hydroxyl number of 42 mg KOH/g and 6.0 parts by weight of polyetherol 6 were used as polyetherol having a hydroxyl number of 28 mg KOH/g. The further starting materials corresponded to the example. The example describes the use of a mixture of diethanolamine and dibutyltin dilaurate as auxiliaries. The mixing ratio here is essential since diethanolamine acts, in particular, as blowing catalyst and catalyzes the reaction of water and isocyanate which leads to $CO_2$ formation, while dibutyltin dilaurate as strong gelling catalyst catalyzes the polyurethane reaction. Without use of the tin catalyst, foam collapse will occur, i.e. the blowing reaction stops before a sufficient polyurethane framework has been formed. In a second experiment, a mixture of 99.95% by weight of diethanolamine and 0.05% by weight of dibutyltin dilaurate was used as auxiliaries, which led to occurrence of severe shrinkage. Here, the polyurethane reaction had, when the blowing reaction commenced, already concluded to such an extent that the blowing agent could no longer escape from the cells and a closed-celled foam was formed. After cooling of the foam to room temperature, the volume of the blowing agent decreased to such an extent that the foam shrank. For this reason, the content of dibutyltin dilaurate was reduced to 5 ppm, but a highly shrunk foam was likewise obtained here. Overall, the example of DE 3710731 could not be reproduced.

In a second comparative example, example 3 of DE 3942330 was reproduced using only 1 part by weight of water instead of 2.6 parts by weight of water. The foam obtained was likewise closed-celled and greatly shrunk.

This demonstrates that it is essential to use the claimed combination of apolar polyols having a high proportion of primary OH groups and a polar polyol as polyol component together with a 4,4'-MDI-comprising prepolymer for the production of viscoelastic foams having a density in the range from 100 WI to 300 WI in order to obtain a usable foam.

The invention claimed is:

1. A process for producing viscoelastic polyurethane foams having a density of from 140 g/dm$^3$ to 220 g/dm$^3$ comprising:
   mixing:
   a) polyisocyanate,
   b) polymeric compounds having groups that are reactive toward isocyanates,
   c) optionally chain extenders and/or crosslinkers,
   d) a catalyst,
   e) a blowing agent comprising water, and
   f) optionally additives
   at an isocyanate index of from 50 to 95 to give a reaction mixture, the reaction mixture being placed on a support and reacted to give the viscoelastic polyurethane foam,
   wherein the polyisocyanate (a) has an isocyanate content of from 20 to 31.5% and is obtainable by mixing 4,4'-MDI and oligomers of propylene oxide having from 2 to 8 propylene oxide units, optionally carbodiimide of 4,4'-MDI and optionally higher homologues of MDI having more than two rings, and
   wherein the polymeric compounds (b) comprise, based on the total weight of the polymeric compounds (b):
   b1) from 15 to 40% by weight of at least one polyalkylene oxide having a hydroxyl number of from 20 to 50 mg KOH/g derived from a trifunctional starter molecule and a proportion of ethylene oxide, based on the content of alkylene oxide, of from 4 to 10% by weight and a proportion of primary OH groups of from 50 to 100%, b2) from 30 to 70% by weight of at least one polyalkylene oxide having a hydroxyl number of from 20 to 50 mg KOH/g derived from a bifunctional starter molecule and a proportion of ethylene oxide, based on the content of alkylene oxide, of from 4 to 10% by weight and a proportion of primary OH groups of from 50 to 100%, b3) from 10 to 30% by weight of at least one polyalkylene oxide having a hydroxyl number of from 400 to 800 mg KOH/g derived from a bifunctional to tetrafunctional starter molecule and a proportion of ethylene oxide, based on the content of alkylene oxide, of from 80 to 100% by weight, and b4) from 0 to 30% by weight of a further polyalkylene oxide.

2. The process according to claim 1, wherein the weight ratio of component b1) and component b2) is from 1:1.5 to 1:2.5.

3. The process according to claim 1, wherein component b1) and component b2) are obtained by alkoxylation of a mixture of the trifunctional starter and the bifunctional starter.

4. The process according to claim 1, wherein water is used as a sole blowing agent e).

5. The process according to claim 1, wherein starting compounds of the polyisocyanate a) comprise from 50 to 90% by weight of 4,4'-MDI, from 1 to 15% by weight of oligomers of propylene oxide having from 2 to 8 propylene oxide units, from 0 to 15% by weight of carbodiimide of 4,4'-MDI and from 0 to 15% by weight of higher homologues of MDI having more than two rings.

6. The process according to claim 5, wherein no further starting compounds comprising isocyanate groups are comprised in the polyisocyanate a).

7. A polyurethane foam obtainable by a process according to claim 1.

8. A mattress, an upholstery element for furniture, or insulation for internal combustion engines comprising the polyurethane foam according to claim 7.

* * * * *